US008527926B2

(12) United States Patent
Nitta

(10) Patent No.: US 8,527,926 B2
(45) Date of Patent: Sep. 3, 2013

(54) INDICATOR CALCULATION METHOD AND APPARATUS

(75) Inventor: Izumi Nitta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/280,623

(22) Filed: Oct. 25, 2011

(65) Prior Publication Data

US 2012/0185814 A1 Jul. 19, 2012

(30) Foreign Application Priority Data

Jan. 18, 2011 (JP) ................................. 2011-007526

(51) Int. Cl.
*G06F 17/50* (2006.01)
(52) U.S. Cl.
USPC ............................. 716/112; 716/101; 716/106
(58) Field of Classification Search
USPC .......................................... 716/101, 106, 112
See application file for complete search history.

(56) References Cited

U.S. PATENT DOCUMENTS

| 7,512,508 | B2 * | 3/2009 | Rajski et al. | 702/118 |
| 2006/0066339 | A1 * | 3/2006 | Rajski et al. | 324/765 |
| 2008/0052656 | A1 * | 2/2008 | Foreman et al. | 716/6 |
| 2010/0005041 | A1 | 1/2010 | Wang | |

FOREIGN PATENT DOCUMENTS

| JP | 2-054342 A | 2/1990 |
| JP | 3-006745 A | 1/1991 |
| JP | 10-021284 A | 1/1998 |

OTHER PUBLICATIONS

Sharma, Manish et al., "Efficiently Performing Yield Enhancements by Identifying Dominant Physical Root Cause from Test Fail Data", International Test Conference 2008, IEEE, Paper 14.3, Oct. 28-30, 2008, pp. 1-9.

* cited by examiner

*Primary Examiner* — Vuthe Siek
*Assistant Examiner* — Mohammed Alam
(74) *Attorney, Agent, or Firm* — Fujitsu Patent Center

(57) ABSTRACT

A method for calculating an indicator value includes: extracting features, which are mutually independent, by using data stored in a data storage unit storing, for each group of circuits implemented on a semiconductor device, the number of actual failures occurred in the group and a feature value of each feature that is a failure factor; generating an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and calculating an indicator value for design change of the semiconductor device from the generated expression of the failure occurrence probability model.

15 Claims, 12 Drawing Sheets

| IDENTIFICATION NO. OF FAILED DIE | FAILURE TYPE | ID OF CANDIDATE FAILING NET |
|---|---|---|
| 1 | open | n1, n2 |
| 2 | open | n2 |
| 2 | bridge | n3, n4 |
| 9 | delay | n5 |
| ⋮ | ⋮ | ⋮ |

FIG.2

| ID | NAME | DEFINITION | MODIFICATION COST |
|---|---|---|---|
| 1 | M1_density_0 | NO. OF UNIT AREAS WHOSE WIRING DENSITY IN M1 LAYER IS EQUAL TO OR GREATER THAN 60% | C |
| 2 | V1_single_via_0 | NO. OF UNIT AREAS WHOSE RATIO OF SINGLE VIA HOLE IS EQUAL TO OR GREATER THAN 80% AMONG VIA HOLES IN V1 LAYER | D |
| ⋮ | ⋮ | ⋮ | ⋮ |

FIG.3

| MODIFICATION COST | COEFFICIENT VALUE |
|---|---|
| A | 0.5 |
| B | 0.8 |
| C | 1.2 |
| D | 2.0 |

FIG.4

| NET ID | FEATURE VALUE |
|---|---|
| N1 | 32000 |
| N2 | 3800 |
| N3 | 5600 |
| N4 | 45000 |
| N5 | 28000 |
| N6 | 9600 |
| N7 | 2200 |
| N8 | 34000 |
| N9 | 5600 |
| N10 | 48000 |

| GROUP | NET ID |
|---|---|
| $G_1$ | N2, N3, N7, N9 |
| $G_2$ | N1, N5, N6 |
| $G_3$ | N4, N8, N10 |

| GROUP ID | NO. OF ACTUAL FAILURES | FEATURE VALUE OF FEATURE 1 | FEATURE VALUE OF FEATURE 2 | FEATURE VALUE OF FEATURE 3 | FEATURE VALUE OF FEATURE 4 | ... |
|---|---|---|---|---|---|---|
| 1 | 2 | 0 | 10 | 5 | 5 | ... |
| 2 | 8 | 3 | 9 | 1 | 1 | ... |
| 3 | 3 | 1 | 5 | 4 | 4 | ... |
| ... | ... | ... | ... | ... | ... | ... |

FIG.10

| FEATURE | FEATURE HAVING STRONG CORRELATION | CORRELATION COEFFICIENT |
|---|---|---|
| V1_single_via_0 | M1_density_0 | 0.94 |
| M3_density_0 | M4_density_0 | 0.98 |
| ⋮ | ⋮ | ⋮ |

| FEATURE NAME | UNIT VARIATION ($\Delta_i$) | VARIATION ($s_i$) OF FAILURE OCCURRENCE PROBABILITY |
|---|---|---|
| M1_density_0 | 0.05 | 0.005 |
| M4_density_0 | 0.10 | 0.02 |
| ⋮ | ⋮ | ⋮ |

INDICATOR CALCULATION METHOD AND APPARATUS

CROSS-REFERENCE TO RELATED APPLICATIONS

This application is based upon and claims the benefit of priority of the prior Japanese Patent Application No. 2011-007526, filed on Jan. 18, 2011, the entire contents of which are incorporated herein by reference.

FIELD

This technique relates to a technique for design of a semiconductor device.

BACKGROUND

The semiconductor device such as Large Scale Integrated (LSI) circuits is tested at the shipping after the design and manufacturing. When any failure is detected at the shipping test and in the market, a failure analysis using a logical simulation or failure dictionary is carried out to extract failure candidates. Based on the failure candidates, failure factors are narrowed by the volume diagnosis in which the statistical analysis is carried out. Then, a failure candidate associated with the narrowed failure factors is selected to determine whether or not the selected failure candidate actually corresponds to a failure on the semiconductor device by a physical analysis using the electron microscope or the like, and a failure cause is identified. The failure cause is feedback to the design of the semiconductor device and/or manufacturing procedure, and any change is provided to decrease the number of failures detected at the shipping test and the like.

The failure diagnosis is a technique to presume a failure location inside of the semiconductor device for which a failure is detected by the shipping test or the like after the manufacturing. Recently, a method is proposed to further narrow the failure factors and/or to presume the failure location by using statistical analysis in the volume diagnosis.

On the other hand, the cost of the physical analysis increases along with sophisticating the manufacturing processes and enlarging the scale of the circuit. In order to decrease the cost of the physical analysis, and early identify the failure cause, it is preferable that the failure candidates to be analysis by the physical analysis are appropriately narrowed in the volume diagnosis.

Conventionally, a method of the volume diagnosis is proposed, where the statistical analysis is carried out based on failure reports of the semiconductor device, which are inputted from the failure analysis tool to output a feature that is a failure factor according to contribution degrees to the failure. The failure report includes information concerning nets or input/output pins as the failure candidates, and may further include a type of failure, such as open failure or bridge failure. Typically, in the method of the volume diagnosis, a list of the features as the candidates of the failure factors is inputted or embodied in a diagnosis apparatus in advance. Here, the features that are the failure factors include layout information such as wiring length, the number of via holes, and wiring density, wiring pattern, which is a factor of the open failure or bridge failure, and the like. This proposed method of the volume diagnosis pays attention to one certain type of feature, and uniformly classifies the circuit information such as netlists to plural groups from the top by sorting in descending order of the feature value of the feature to which the attention is paid. For each group, an expected value of the number of failures and measured value of the number of failures are respectively calculated. The expected value is calculated using a model expression based on the feature value of the feature to which the attention is paid, and the measured value is calculated by counting the failure candidates included in each group from the failure list. In addition, the contribution degree (or importance degree) of the one certain type of feature, to which the attention is paid, to the failure is calculated based on the similarity of the distributions of the expected value and measured value. By repeating the aforementioned processing for all types of features to calculate the contribution degrees of the respective types of features to the failure, the feature of the type whose contribution degree is high is identified as the failure factor.

However, the main object of this technique is to shorten the time required for identifying the failure factor. In addition, even when the ranking of the features by the contribution degree and information concerning the failure location are obtained, it is difficult to specifically determine how much the design should be modified. For example, when the failure rate becomes high in an area where the via holes concentrate, it is difficult for the designer to determine how much the density of the via holes should be lowered. In addition, unless the difficulty of the modification is considered, it is impossible to appropriately determine for which feature the design should be modified.

Namely, there is no indicator appropriate for the design change to be carried out in order to decrease the failure of the semiconductor device.

SUMMARY

A method for calculating an indicator value includes: extracting features, which are mutually independent, by using data stored in a data storage unit storing, for each group of circuits implemented on a semiconductor device, the number of actual failures occurred in the group and a feature value of each feature that is a failure factor; generating an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and calculating an indicator value for design change of the semiconductor device from the generated expression of the failure occurrence probability model.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of failure reports;

FIG. 3 is a diagram depicting an example of a failure factor list;

FIG. 4 is a diagram depicting an example of a coefficient table;

FIG. 10 is a diagram depicting an example of learning data;

FIG. 18 is a diagram depicting an example of a list regarding a unit variation of a feature value;

DESCRIPTION OF EMBODIMENTS

Figure 1:
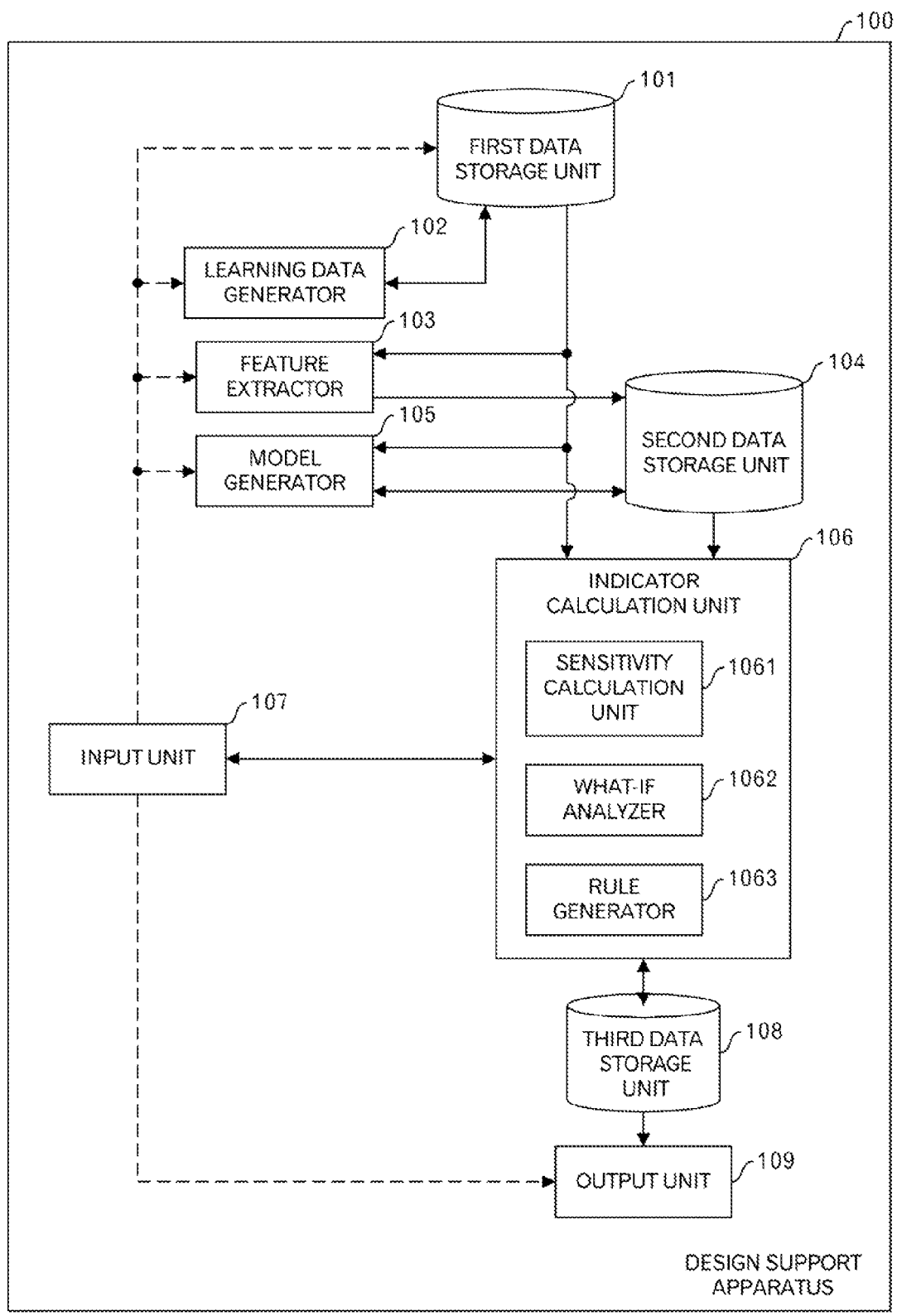
FIG. 1 is a functional block diagram of a design support apparatus relating to an embodiment of this technique.

FIG. 1 illustrates a functional block diagram of a design support apparatus 100 relating to one embodiment of this technique. The design support apparatus 100 has a first data storage unit 101, learning data generator 102, feature extractor 103, second data storage unit 104, model generator 105, indicator calculation unit 106, input unit 107, third data storage unit 108 and output unit 109. In addition, the indicator calculation unit 106 has a sensitivity calculation unit 1061, what-if analyzer 1062 and rule generator 1063.

The first data storage unit 101 stores failure reports generated, for example, by the conventional technique, data of the netlists, layout data, failure factor list, data of the design rule and other data. Such data may be obtained from other computers connected to the design support apparatus 100 or may be inputted from the input unit 107.

The learning data generator 102 generates learning data by using data stored in the first data storage unit 101, and stores the learning data into the first data storage unit 101. The feature extractor 103 extracts features that are parameters in a failure occurrence probability model by using data stored in the first data storage unit 101, and stores data of the features into the second data storage unit 104.

The model generator 105 generates the failure occurrence probability model by using data stored in the first data storage unit 101 and second data storage unit 104, and stores data of the model into the second data storage unit 104. The indicator calculation unit 106 calculates an indicator value for the design change or the like by using data stored in the first data storage unit 101 and second data storage unit 104, and stores the calculated indicator value into the third data storage unit 108. Specifically, the sensitivity calculation unit 1061 calculates the indicator value representing the sensitivity. The what-if analyzer 1062 calculates a variation of the failure occurrence probability for a designated variation of the feature designated by the user, for example. Furthermore, the rule generator 1063 generates a rule (also called preferred rule) appropriate for the design change or the like from an objective function that will be explained later.

The output unit 109 outputs data stored in the third data storage unit 108 to an output device. Incidentally, the input unit 107 outputs data from the user to the indicator calculation unit 106. However, the input unit 107 may output instructions or input data from the user to the learning data generator 102, feature extractor 103, model generator 105 and output unit 109. Furthermore, data stored in the first data storage unit 101 may be inputted through the input unit 107.

The first data storage unit 101 stores data of the failure reports as illustrated in FIG. 2, for example. The failure report is data outputted as an analysis result of the volume diagnosis, which was referenced in the column of the background art. In an example of FIG. 2, the identification number of the failed die, failure type and identifier (ID) of the candidate failing net are registered into a table. There is a case where plural candidate failing nets are identified for one die. However, the number of failed dies (=the number of actual failures) can be counted for each net ID from this data.

Moreover, FIG. 3 illustrates an example of a failure factor list stored in the first data storage unit 101. In an example of FIG. 3, an identifier (ID) of the feature that is the failure factor, name, definition and modification cost are registered into a table. As exemplified in FIG. 3, as for the feature that is the failure factor, a feature that can be expressed as a design rule is defined. Moreover, as for the modification cost, a rank (or numerical value representing the rank) representing the easiness of the design change is registered. In the example of FIG. 3, "A" represents a rank of the least cost and "D" represents a rank of the greatest cost.

Furthermore, FIG. 4 illustrates an example of a coefficient table that is other data stored in the first data storage unit 101. In an example of FIG. 4, for each rank of the modification cost, a value β of the coefficient in a modification cost function, which will be explained later, is registered. In this example, the coefficient value of the rank A in the modification cost is the minimum, and as the rank is upgraded from B to D, the coefficient value becomes greater, and the modification cost also becomes greater.

Moreover, the first data storage unit 101 stores the number N of semiconductor chips to be analyzed, as other data.

Figure 5:
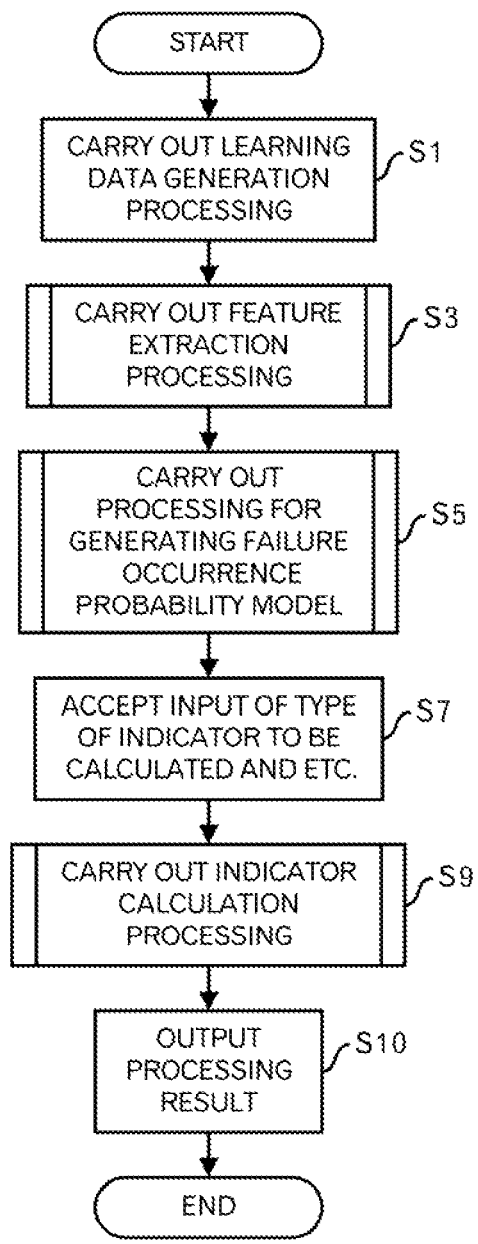
FIG. 5 is a diagram depicting a processing flow of a main processing in the embodiment.

Next, processing contents of the design support apparatus 100 will be explained by using FIGS. 5 to 21. First, the learning data generator 102 carries out a learning data generation processing by using data stored in the first data storage unit 101, and stores the generated learning data into the first data storage unit 101 (FIG. 5: step S1).

Figures 6, 8:
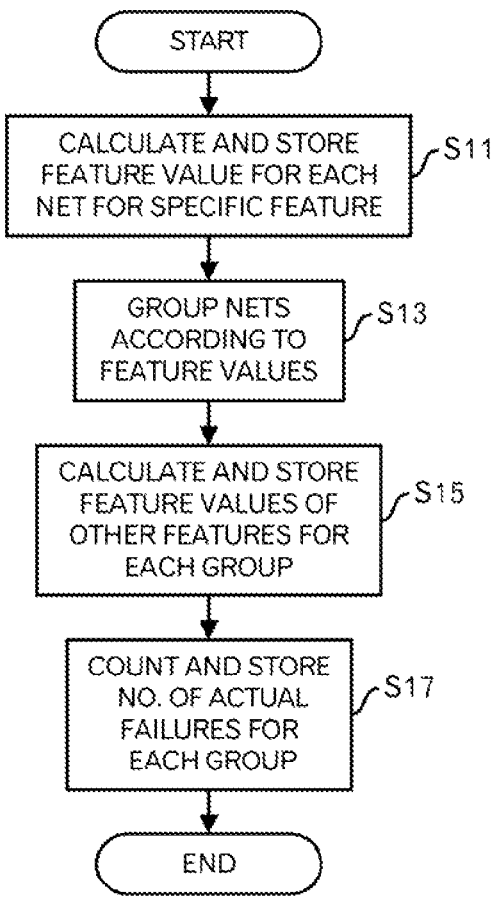
FIG. 6 is a diagram depicting an example of a processing flow of a learning data generation processing.
FIG. 8 is a diagram to explain the learning data generation processing.

An example of the learning data generation processing is illustrated in FIG. 6. The learning data generator 102 calculates, for each net, a feature value from the layout data stored in the first data storage unit 101 for a specific feature defined in the failure factor list, and stores the calculated feature value into the first data storage unit 110 (step S11).

Figures 7, 9:
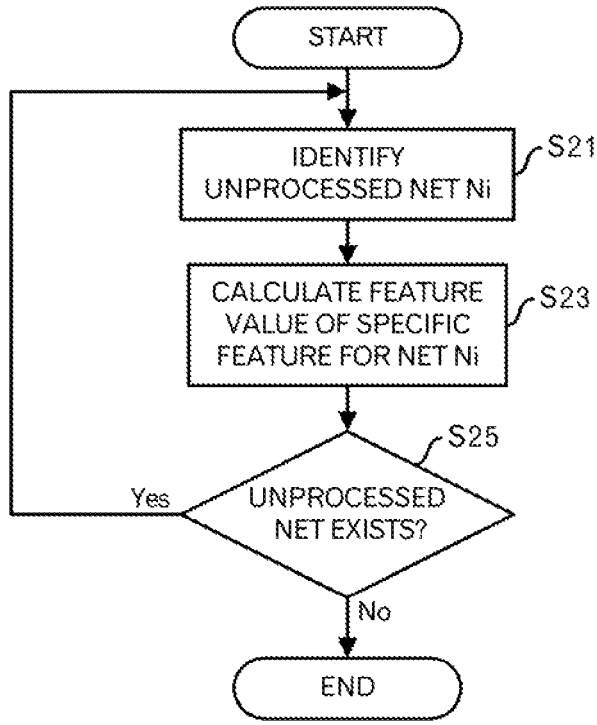
FIG. 7 is a diagram to explain the learning data generation processing.
FIG. 9 is a diagram to explain the learning data generation processing.

The processing of the step S11 is a processing as illustrated in FIG. 7, for example. First, the learning data generator 102 identifies an unprocessed net Ni in the data of the netlists (step S21). Then, the learning data generator 102 calculates the feature value of a specific feature for the net Ni by using the layout data or the like, and stores the feature value into the first data storage unit 101 (step S23). After that, the learning data generator 102 determines whether or not any unprocessed net exists (step S25), and when any unprocessed net exists, the processing returns to the step S21, and when no unprocessed net exists, the processing ends.

For example, when the specific feature is the number of unit areas whose wiring density in M1 layer becomes 60% and greater, the number of unit areas whose wiring density is equal to or greater than 60% is counted at the step S23 among the unit areas through which the net Ni passing through the M1 layer also passes. Then, data as illustrated in FIG. 8 is stored in the first data storage unit 101, for example. In an example of FIG. 8, when 10 nets are found, the feature value calculated for the specific feature is registered for each net.

Returning to the explanation of the processing in FIG. 6, the learning data generator 102 groups the respective nets in the netlists according to the feature values calculated at the step S11 (step S13). Although there are various grouping methods, the nets are sorted in ascending order of the feature value and are grouped according to the order into the predetermined number of groups, as one method. In the example of FIG. 8, the nets are ordered as follows: N7, N2, N3, N9, N6, N5, N1, N8, N4 and N10. Therefore, as illustrated in FIG. 9, the nets N7, N2 and N3 are grouped into a group $G_1$, the nets N6, N5 and N1 are grouped into a group $G_2$, and the nets N8, N4 and N10 are grouped into a group $G_3$. Incidentally, the result obtained by carrying out a similar processing to other features and grouping the nets in another viewpoint may also be adopted.

Furthermore, the learning data generator 102 calculates feature values for other features for each group, and stores the calculation results into the first data storage unit 101 (step S15). For each feature other than the specific feature among the features that are the failure factors and are registered in the failure factor list, the feature value is calculated for each group. For example, in case of the feature that is the number of unit areas whose ratio of the single via holes among the via holes in the V1 layer is equal to or greater than 80%, the number of unit areas whose ratio of the single via holes is equal to or greater than 80% is counted among the unit areas through which the wiring of the net Ni passing through the V1 layer passes based on the layout data, and the counted values are summed for each group.

Then, the learning data generator 102 counts the number of actual failures for each group from the failure reports, and stores the counted values into the first data storage unit 101 (step S17). In the example of FIG. 2, the appearance frequency is counted for each net ID, and when the appearance frequencies are summed for each group, the number of actual failures is calculated.

By carrying out such a processing, data as illustrated in FIG. 10 is stored in the first data storage unit 101 as the learning data, for example. In the example of FIG. 10, for each group, a group ID, the number of actual failures, feature value of feature 1, feature value of feature 2, feature value of feature 3, feature value of feature 4 and the like are stored in a table. The number of features depends on the failure factor list.

Returning to the explanation of the processing in FIG. 5, the feature extractor 103 next carries out a feature extraction processing by using data stored in the first data storage unit 101, and stores the processing result into the second data storage unit 104 (step S3). The feature extraction processing will be explained by using FIGS. 11 to 13.

Figures 11, 12:
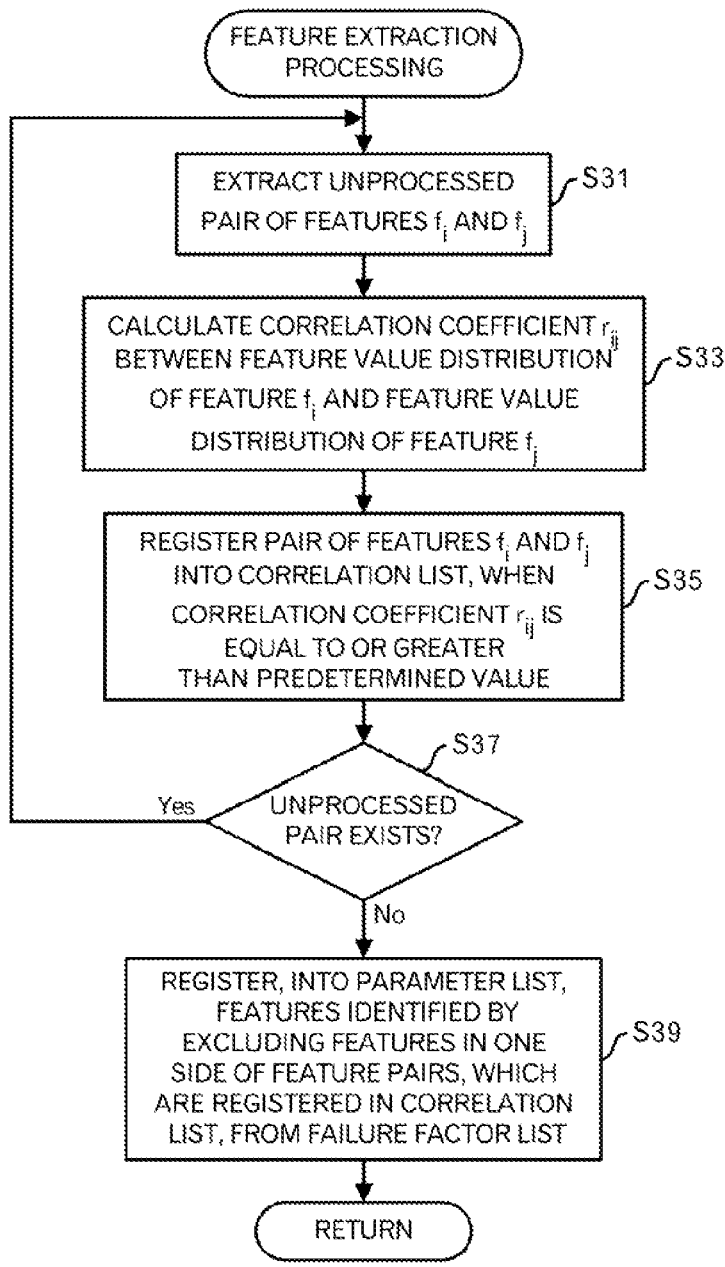
FIG. 11 is a diagram depicting a processing flow of a feature extraction processing.
FIG. 12 is a diagram depicting an example of a correlation list.

First, the feature extractor 103 extracts an unprocessed pair of features $f_i$ and $f_j$ from the failure factor list (FIG. 11: step S31). Then, the feature extractor 103 calculates a correlation coefficient $r_{ij}$ between distribution of the feature values of the feature $f_i$ and distribution of the feature values of the feature $f_j$ by using the learning data stored in the first data storage unit 101, and stores the coefficient into the second data storage unit 104, for example (step S33). In the example of FIG. 10, the correlation coefficient $r_{12}$ is calculated by using values in the column of the feature values of the feature 1 and in the column of the feature values of the feature 2.

Then, when the correlation coefficient $r_{ij}$ is equal to or greater than a predetermined value (e.g. 0.95), the feature extractor 103 registers the pair of features $f_i$ and $f_j$ into a correlation list in the second data storage unit 104 (step S35). For example, the correlation list as illustrated in FIG. 12 is stored in the second data storage unit 104. In an example of FIG. 12, a first feature, a second feature whose correlation with the first feature is strong and correlation coefficient are registered into a table. In this embodiment, when the correlation coefficient $r_{ij}$ is less than the predetermined value, the feature is not registered into the correlation list.

Figures 13, 14, 15:
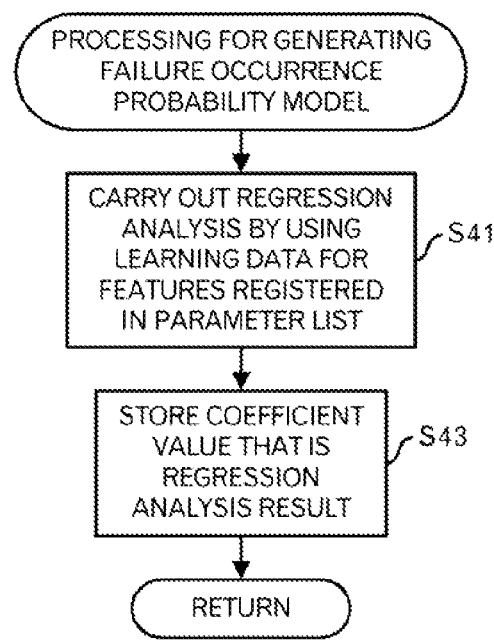
FIG. 13 is a diagram depicting an example of a parameter list.
FIG. 14 is a diagram a processing flow of a processing for generating a failure occurrence probability model.
FIG. 15 is a diagram depicting an example of coefficients in an expression of the failure occurrence probability model.

After that, the feature extractor 103 determines whether or not an unprocessed pair of features exists in the failure factor list (step S37). When any unprocessed pair of features exits, the processing returns to the step S31. On the other hand, when there is no unprocessed pair of features, the feature extractor 103 excludes features in one side of the pairs of features, which are stored in the correlation list, and stores remaining features as a parameter list into the second data storage unit 104 (step S39). For example, when the features in the column of the first feature are excluded from the failure factor list, the parameter list becomes a list as illustrated in FIG. 13, for example. In an example of FIG. 13, features whose correlation with other features is weak and remaining features in the correlation list are registered in the parameter list.

By carrying out such a processing, the features as parameters used to generate the failure occurrence probability model have been extracted. Specifically, it becomes possible to avoid a situation where, when a value of a certain feature is changed, a value of another feature is also changed simultaneously, and the failure occurrence probability is influenced.

Returning to the explanation of the processing of FIG. 5, the model generator 105 carries out a processing to generate a failure occurrence probability model by using data stored in the first data storage unit 101 and second data storage unit 104 (step S5). The processing to generate the failure occurrence probability model will be explained by using FIG. 14.

The model generator 105 carries out a regression analysis by using the learning data stored in the first data storage unit 101 for the features registered in the parameter list stored in the second data storage unit 104, and stores coefficient values and the like, which are results of the regression analysis, into the second data storage unit 104 (step S41). As for the regression analysis, a well-known method such the least squares method or support vector machine is used.

Then, an expression of the failure occurrence probability model is generated for the feature $f_i$.

$$p = \sum_{i=1}^{m} \alpha_i \cdot f_i + C$$

"p" represents the failure occurrence probability, and the failure occurrence probability for each group is calculated by dividing the number of actual failures, which is included in the learning data stored in the first data storage unit 101, by the number of semiconductor chips. $\alpha_i$ is a coefficient value calculated by the regression analysis. C represents a constant term.

By adopting such a linear model, the variation of the failure occurrence probability can be predicted, when the value of one feature is improved.

Then, the model generator 105 stores the coefficient values that are the results of the regression analysis into the second data storage unit 104 (step S43). For example, data as illustrated in FIG. 15 is stored. In an example of FIG. 15, a value of the constant term C, and coefficient values for the respective features, which are registered in the parameter list, are registered in a table.

Returning to the explanation of the processing of FIG. 5, the input unit 107 prompts the user to input a type of an indicator to be calculated or the like, and when the user inputs the type of the indicator, the input unit 107 accepts the input data (step S7). Then, the input unit 107 outputs the input data to the indicator calculation unit 106. In this embodiment, any one of the indicator representing the sensitivity, the failure occurrence probability by the what-if analysis and a rule (i.e. preferred rule) to improve the failure occurrence probability is selected.

Then, the indicator calculation unit 106 carries out an indicator calculation processing (step S9). The indicator calculation processing will be explained by using FIGS. 16 to 20.

Figure 16:
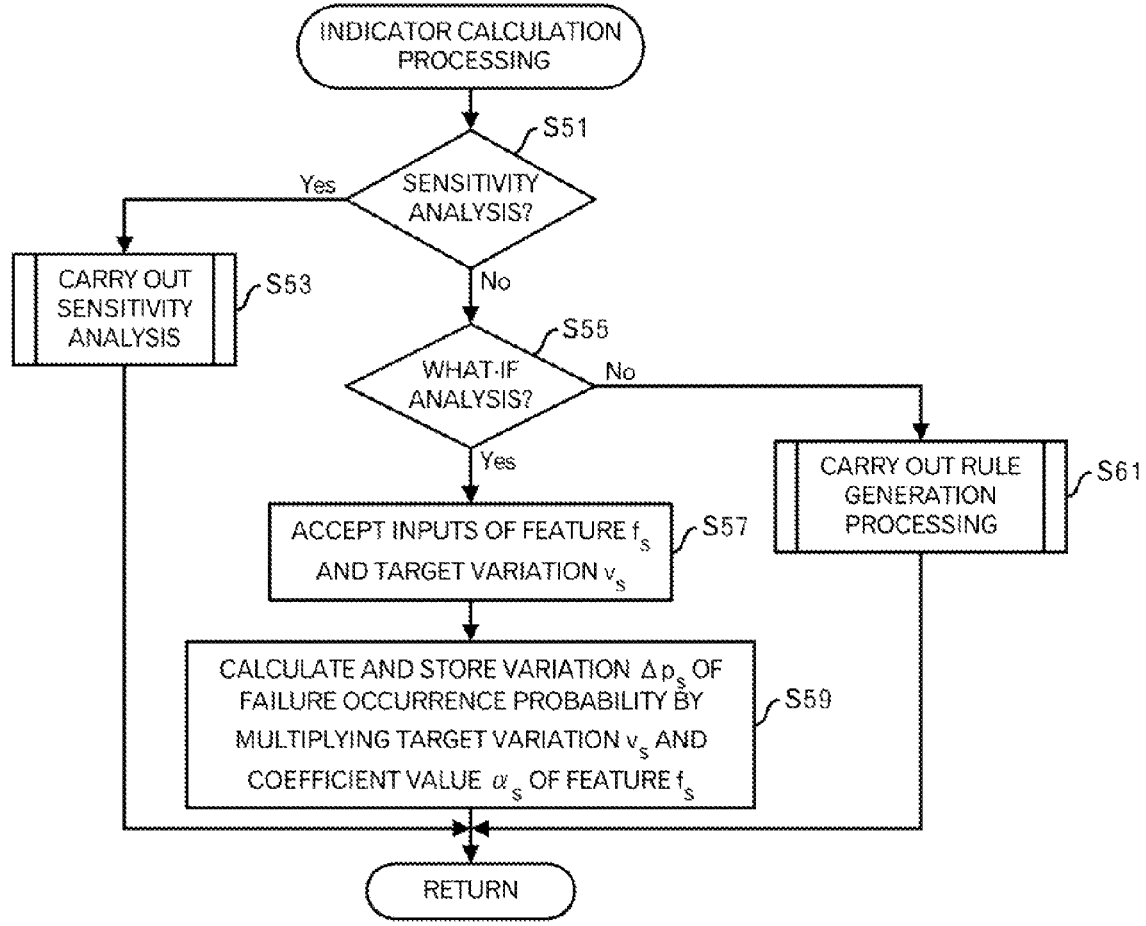
FIG. 16 is a diagram depicting a processing flow of an indicator calculation processing.

The indicator calculation unit 106 determines, from the instruction from the user, whether or not a sensitivity analysis should be carried out (FIG. 16: step S51). When the sensitivity analysis should be carried out, the sensitivity calculation unit 1061 carries out the sensitivity analysis (step S53). The sensitivity analysis will be explained by using FIGS. 17 to 19.

Figures 17, 19:
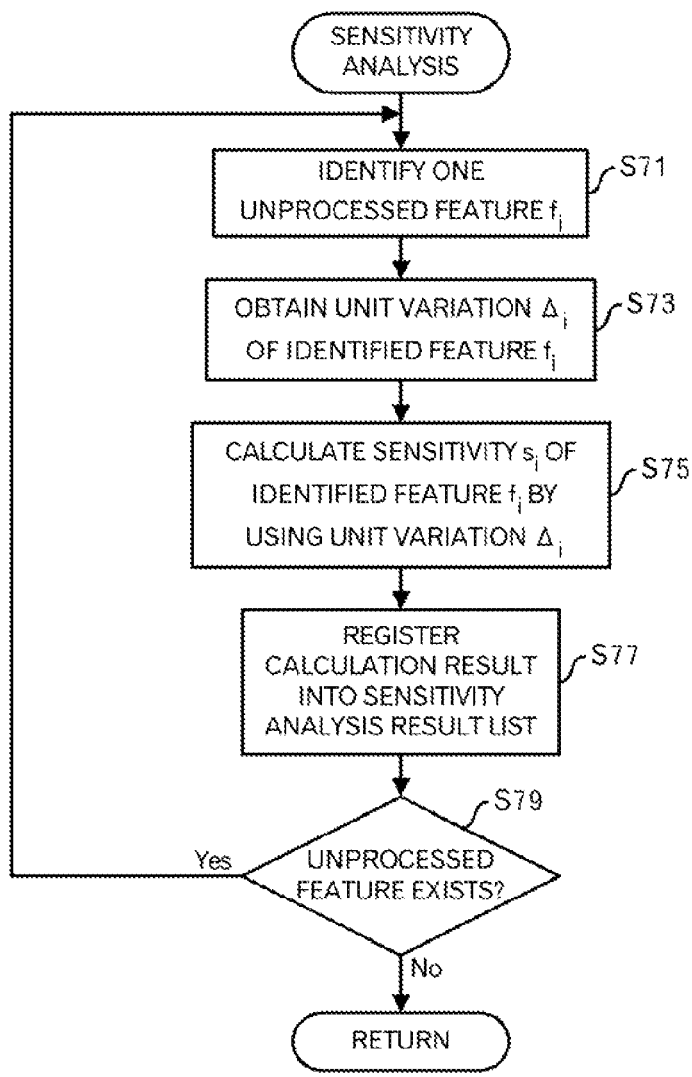
FIG. 17 is a diagram depicting a processing flow of a sensitivity analysis.
FIG. 19 is a diagram depicting an example of a sensitivity analysis list.

The sensitivity calculation unit 1061 identifies an unprocessed feature $f_i$ in the parameter list stored in the second data storage unit 10 (FIG. 17: step S71). Then, the sensitivity calculation unit 1061 obtains a unit variation $\Delta_i$ of the identified feature $f_i$ from the first data storage unit 101, for example (step S73). For example, as illustrated in FIG. 18, the unit variation $\Delta_i$ is stored for each feature. This data may be inputted from the input unit 107 operated by the user, or may be prepared in advance.

After that, the sensitivity calculation unit 1061 calculates the sensitivity $s_i$ of the identified feature $f_i$ by using the unit variation $\Delta_i$ (step S75). In this embodiment, the sensitivity is defined as follows:

$$s_i = p(f_i + \Delta_i) - p(f_i)$$
$$= \alpha_i * \Delta_i$$

Therefore, $\alpha_i * \Delta_i$ is calculated, here.

Then, the sensitivity calculation unit 1061 registers the calculation result into a sensitivity analysis result list in the third data storage unit 108 (step S77). For example, data as illustrated in FIG. 19 is stored in the third data storage unit 108. In an example of FIG. 19, for each feature $f_i$ in the parameter list, the unit variation $\Delta_i$ and the failure occurrence probability variation $s_i$ are registered.

After that, the sensitivity calculation unit 1061 determines whether or not an unprocessed feature in the parameter list exists (step S79), and when there is an unprocessed feature, the processing returns to the step S71. On the other hand, when no unprocessed feature exists, the processing returns to the calling-source processing.

By carrying out such a processing, it becomes possible to determine, for each feature registered in the parameter list, how much the failure occurrence probability easily varies when changing the feature value.

Returning to the explanation of the processing of FIG. 16, when the sensitivity analysis processing ends, the processing returns to the calling-source processing. On the other hand, when the user does not instruct the sensitivity analysis, the indicator calculation unit 106 determines whether or not the instruction from the user is the what-if analysis (step S55). When the user instructed the what-if analysis, the what-if analyzer 1062 instructs the input unit 107 to prompt the user to designate the feature $f_s$ to be processed and input a target variation $v_s$ for the feature $f_s$. In response to this instruction, the input unit 107 prompts the user to designate and input data, accepts the designated and inputted data and outputs the accepted data to the what-if analyzer 1062. The what-if analyzer 1062 receives, from the input unit 107, the feature $f_s$ to be processed and the target variation $v_s$ for the feature $f_s$ (step S57).

Then, the what-if analyzer 1062 calculates a variation $\Delta p_s$ of the failure occurrence probability by multiplying the target variation $v_s$ and the coefficient value $\alpha_s$ of the feature $f_s$, and stores the variation $\Delta p_s$ into the third data storage 108 in association with the target variation $v_s$ and feature $f_s$ (step S59). Then, the processing returns to the calling-source processing.

Thus, it is possible to grasp how much the failure occurrence probability changes, when the specific feature $f_s$ is modified by the target variation $v_s$.

Furthermore, when the user does not instruct the what-if analysis, the rule generator 1063 carries out a rule generation processing (step S61). The rule generation processing will be explained by using FIGS. 20 and 21.

Figures 20, 21:
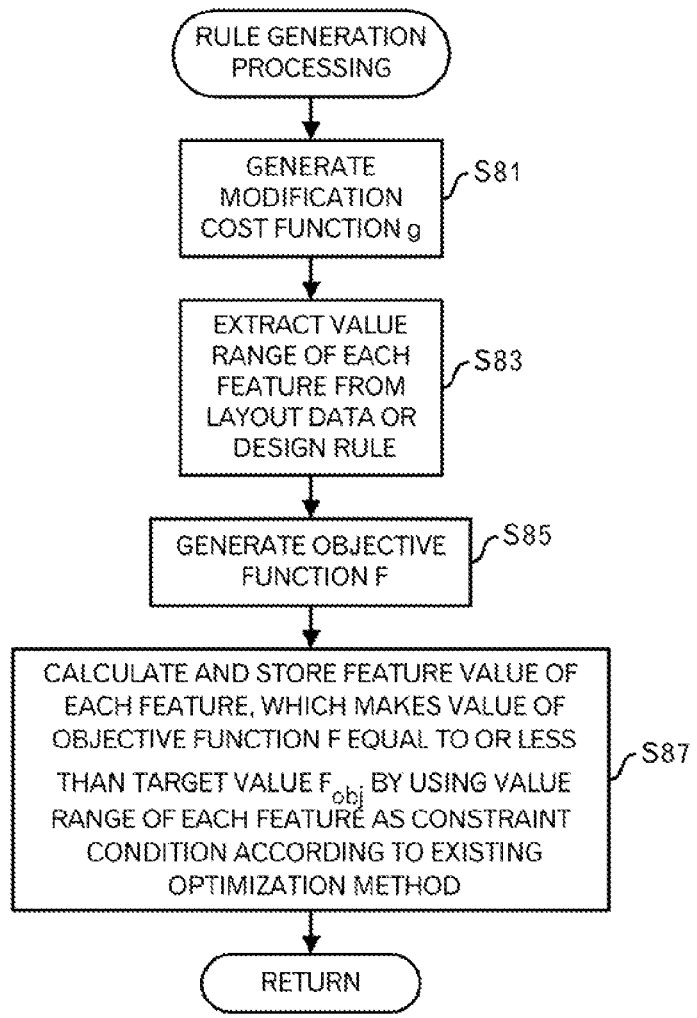
FIG. 20 is a diagram depicting a processing flow of a rule generation processing.
FIG. 21 is a diagram to explain a constraint condition.

First, the rule generator 1063 generates a modification cost function g, and stores the data of the function into the third data storage unit 108, for example, (FIG. 20: step S81).

In this embodiment, the following modification cost function g is used.

$$g = \sum_{i=1}^{k} \beta_i \cdot \sum_{j=1}^{M} (f_{ij} - f'_{ij})^2$$

k is a value equal to or less than m (m is the number of features registered in the parameter list). The feature, which is a variable of the modification cost function g, may be designated by the user through the input unit 107, or may be set in advance. In order to set in advance, the feature, which can be modified or is effective for the modification, is checked.

$f_{ij}$ is a variable representing a breakdown of the feature value $f_i$ of the feature, and is a variable of the feature value after the design change (i.e. modification). Namely, $f_i$ is represented as follows:

$$f_i = \sum_{j=1}^{M} f_{ij} \qquad (1)$$

More specifically, when the feature is the wiring density, this variable $f_{ij}$ is the wiring density in each mesh element j when dividing the die into mesh elements.

However, other division methods, which are different from the meshing of the die, may be adopted. In addition, according to the feature, the setting method of the breakdown may be different.

Moreover, $f'_{ij}$ is a pertinent feature value before the design change, and in the aforementioned example, it is obtained by calculating the wiring density in each mesh element j from, for example, the layout data, when dividing the die into mesh elements. Incidentally, M is the total number of mesh elements.

$\beta_i$ is a weight coefficient value for the feature. This weight coefficient value is identified from a modification cost rank of the feature i by using a table illustrated in FIG. 4 or the like.

Thus, in this embodiment, the modification cost of each feature is defined as being proportional to the square of the variation of the feature value by the design change or the like.

In addition, the rule generator 1063 extracts a value range within which each feature may vary from the layout data or design rule, and stores data of the value range into the third data storage unit 108, for example (step S83). For example, when the value range of the feature i is defined in the design rule stored in the first data storage unit 101, the value range is used. Moreover, when the value range of the feature i is not defined in the design rule stored in the first data storage unit 101, the value range within which the feature value $f_i$ of the feature i may vary is extracted from the layout data stored in the first data storage unit 101.

For example, in case where the feature i is the wiring density in the M1 layer, this variable $f_{ij}$ is the wiring density in the M1 layer in each mesh element j when dividing the die into mesh elements, for example. When the wiring density is calculated from the layout data for each mesh element as illustrated in FIG. 21, the value range is as follows:

$$f_{i\_min}=0.01 \leq f_i \leq f_{i\_max}=0.8$$

After that, the rule generator 1063 generates an objective function F(p, g) from an expression p of the failure occurrence probability model and the modification cost function g (step S85). In this embodiment, the objective function F(p, g) is defined as follows:

$$F(p, g) = a \cdot \sum_i^k \alpha_i \sum_j^M f_{ij} + b \cdot \sum_i^k \beta_i \sum_j^M (f_{ij} - f'_{ij})^2 \quad (2)$$

The first term of the expression (2) is derived from the expression p of the failure occurrence probability model. However, the feature value $f_i$ of the feature, which is a variable, is limited to the feature value of the feature adopted in the modification cost function g. Namely, the first term does not include the feature values of the features that are registered in the parameter list but are not included in the modification cost function g. Moreover, the first term of the expression (2) is described by the variables $f_{ij}$ representing the breakdown of the feature $f_i$ of the feature i. Incidentally, as for the weight coefficient a of the first term and weight coefficient b of the second term, predetermined values are used. The user may designate them.

Then, the rule generator 1063 calculates the feature value of each feature, which makes the value of the objective function F(p, g) equal to or less than the target value $F_{obj}$, according to an existing optimization method such as Genetic Algorithm, by using, as a constraint, the value range within which the feature value of each feature may vary, and stores the calculated value into the third data storage unit 108 (step S87). The aforementioned relation is represented by a following expression.

$$F(p, g) = a \cdot \sum_i^k \alpha_i \sum_j^M f_{ij} + b \cdot \sum_i^k \beta_i \sum_j^M (f_{ij} - f'_{ij})^2 \leq F_{obj}$$

The constraint is as follows:

$$f_{i\_min} \leq f_{ij} \leq f_{i\_max}$$

Incidentally, i is an integer, which is equal to or greater than "1" and equal to or less than k, and j is an integer, which is equal to or greater than "1" and equal to or less than M.

Thus, a combination of the values of the variables $f_{ij}$, which make the value of the objective function F equal to or less than the target value $F_{obj}$, which is designated by the user or is set in advance, is calculated according to the existing optimization method.

Incidentally, when a single value such as $f_{ij}=0.5$ is obtained as a solution, it is adopted as it is. However, in order to make it easy for the designer to understand, the output data is generated in a format following the design rule, such as "make a ratio of the areas whose wiring density in the M2 layer is equal to or greater than 60% "equal to or less than 5%"", or "make a ratio of the single via holes in the V2 layer "equal to or less than 5%"".

On the other hand, when plural values such as $f_{ij}=0.4$ and 0.6 are obtained as the solutions, it is determined whether or not the value of the objective function F(p, g) is equal to or less than $F_{obj}$ within a value range [0.4, 0.6]. When the value of the objective function F(p, g) is equal to or less than $F_{obj}$ within the value range [0.4, 0.69], [0.4, 0.6] is adopted as the value range of the solutions of $f_{ij}$. When the value of the objective function F(p, g) does not become equal to or less than $F_{obj}$ within the value range [0.4, 0.6], a range within which the value of the objective function F(p, g) is equal to or less than $F_{obj}$ is searched, and the detected range is outputted. According to circumstances, only 0.4 and 0.6 may satisfy the aforementioned condition. The output format determined according to the design rule is adopted as described above.

By carrying out the aforementioned processing, it is possible to obtain the breakdown of the feature value of each feature which makes the value of the objective function F(p, g) equal to or less than the target value $F_{obj}$, while satisfying the constraint condition. Incidentally, because the expression (1) is satisfied, the solution for the feature $f_i$ may be calculated.

When such a processing is carried out, the processing returns to the processing in FIG. 16, and further returns to the processing in FIG. 5. Then, the output unit 109 outputs data of the processing result, which is stored in the third data storage unit 108, to the output device such as a display device (step S10). When the user designates the sensitivity analysis, it becomes possible to grasp what feature has high sensitivity, by outputting data as illustrated in FIG. 19. That is, it becomes possible to grasp what feature efficiently decreases the failure occurrence probability when the feature value of that feature is changed.

However, there is a case where it is difficult to change the feature value even if the sensitivity of the feature is high, or a case where the modification cost to modify the design in order to change the feature value becomes high. Even in such a case, because a target value of each feature is quantitatively outputted in form of taking into consideration the modification cost when the rule generator 1063 generates the rule, it becomes possible for the designer to carry out the design change or the like while referring to the target value. For example, when [0.4, 0.6] is obtained as the solution, it is recommended that the design change or the like is carried out so that the feature value of the feature is not out of this range.

Similarly, when 0.05 is obtained as the solution, it is recommended that the design change or the like is carried out so that the feature value becomes close to 0.05.

In addition, when it is known that the feature value of a specific feature can be easily changed, it is possible to grasp the change of the failure occurrence probability by designating a specific variation of the specific feature in the what-if analysis.

Although the embodiment of this technique was explained, this technique is not limited to the embodiment. For example, the functional block diagram of the design support apparatus is a mere example, and does not always correspond to an actual program module configuration.

In addition, as for the processing flows, as long as the processing result does not change, the processing order can be changed or plural steps may be executed in parallel.

Furthermore, as for the aforementioned modification cost function and objective function, other functions representing the similar gist may be used. Moreover, the functions of the design support apparatus 100 may be implemented in plural computers.

Figure 22:
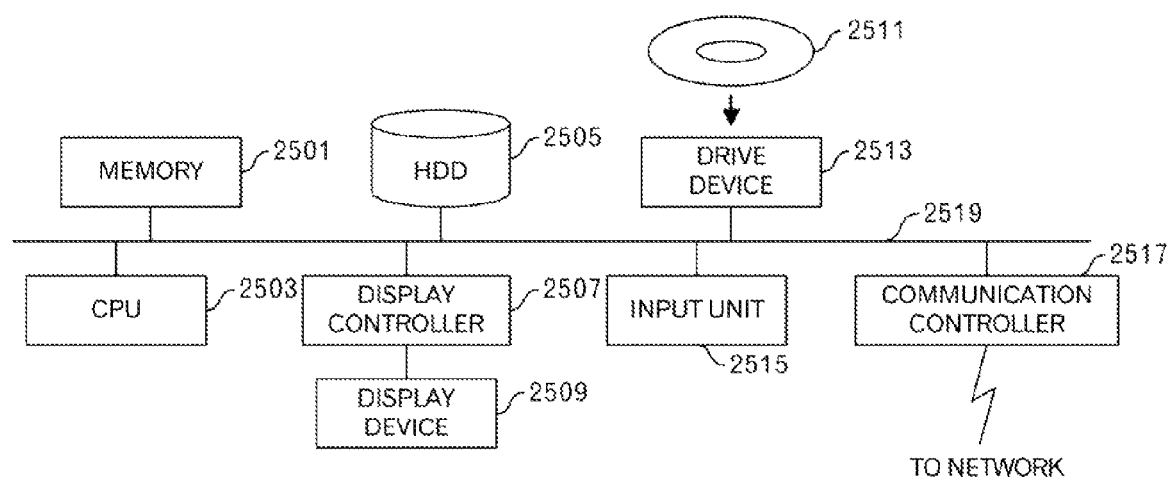
FIG. 22 is a functional block diagram of a computer.

In addition, the aforementioned design support apparatus 100 is a computer device as shown in FIG. 22. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

According to this embodiment, an indicator value calculation method includes: extracting features, which are mutually independent, by using data stored in a data storage unit storing, for each group of circuits implemented on a semiconductor device, the number of actual failures occurred in the group and a feature value of each feature that is a failure factor; generating an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and calculating an indicator value for design change of the semiconductor device from the generated expression of the failure occurrence probability model.

Thus, because the quantitative indicator value is obtained from the expression of the failure occurrence probability model, it becomes possible to obtain a specific target of the design change or the like.

Incidentally, the aforementioned calculating may include: generating an objective function from the expression of the failure occurrence probability model and a modification cost function representing a modification cost of at least one of the extracted features; and calculating a feature value of the at least one of the extracted features, which makes a value of the generated objective function equal to or less than a target value. Thus, it becomes possible to obtain a target value of each feature, which is preferable to decrease the failure occurrence probability while taking into consideration the modification cost.

Furthermore, the calculating may include: calculating, for each of the extracted features, a product of a coefficient in the expression of the failure occurrence probability model and a unit variation. By calculating the aforementioned value, the feature having high sensitivity can be identified.

Moreover, the aforementioned calculating may include: calculating a product of a target variation inputted for a designated feature among the extracted features and a coefficient for the designated feature in the expression of the failure occurrence probability model. Thus, it becomes possible to specifically grasp how much the designated feature changes the failure occurrence probability.

Incidentally, the aforementioned generating the objective function may include: generating the modification cost function by adding, with first weights for second features $f_i$ included in the extracted features, total sums of squares of differences between a variable $f_{ij}$ representing breakdown of each of the second features and a specific feature value $f'_{ij}$ of the variable $f_{ij}$; and generating the objective function by adding, with second weights, a total sum of terms regarding the second features, which are included in the expression of the failure occurrence probability model, and the modification cost function. Thus, it becomes possible to appropriately reflect the modification cost to the objective function.

Furthermore, in the calculating the feature value, a value range of a second feature included in the extracted features may be extracted from a predetermined design rule or layout data of the semiconductor device, and may be used for a constraint condition. Thus, a realistic constraint condition is set.

In addition, the aforementioned specific feature value may be extracted from the layout data of the semiconductor device.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process comprising:
    extracting features, which are mutually independent, by using data stored in a data storage unit storing, for each group of circuits implemented on a semiconductor device, the number of actual failures occurred in the group and a feature value of each feature that is a failure factor;
    generating an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and
    calculating an indicator value for design change of the semiconductor device from the generated expression of the failure occurrence probability model.

2. The computer-readable, non-transitory storage medium as set forth in claim 1, wherein the calculating comprises:
    generating an objective function from the expression of the failure occurrence probability model and a modification cost function representing a modification cost of at least one of the extracted features; and
    calculating a feature value of the at least one of the extracted features, which makes a value of the generated objective function equal to or less than a target value.

3. The computer-readable, non-transitory storage medium as set forth in claim 1, wherein the calculating comprises:
    calculating, for each of the extracted features, a product of a coefficient in the expression of the failure occurrence probability model and a unit variation.

4. The computer-readable, non-transitory storage medium as set forth in claim 1, wherein the calculating comprises:
    calculating a product of a target variation inputted for a designated feature among the extracted features and a coefficient for the designated feature in the expression of the failure occurrence probability model.

5. The computer-readable, non-transitory storage medium as set forth in claim 2, wherein the generating the objective function comprises:
    generating the modification cost function by adding, with first weights for second features $f_i$ included in the extracted features, total sums of squares of differences between a variable $f_{ij}$ representing a breakdown of each of the second features and a specific feature value $f'_{ij}$ of the variable $f_{ij}$; and
    generating the objective function by adding, with second weights, a total sum of terms regarding the second features, which are included in the expression of the failure occurrence probability model, and the modification cost function.

6. The computer-readable, non-transitory storage medium as set forth in claim 2, wherein, in the calculating the feature value, a value range of a second feature included in the extracted features is extracted from a predetermined design rule or layout data of the semiconductor device, and used for a constraint condition.

7. The computer-readable, non-transitory storage medium as set forth in claim 5, wherein the specific feature value is extracted from layout data of the semiconductor device.

8. A method comprising:
    extracting, by a computer, features, which are mutually independent, by using data stored in a data storage unit storing, for each group of circuits implemented on a semiconductor device, the number of actual failures occurred in the group and a feature value of each feature that is a failure factor;
    generating, by the computer, an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and
    calculating, by the computer, an indicator value for design change of the semiconductor device from the generated expression of the failure occurrence probability model.

9. The method as set forth in claim 8, wherein the calculating comprises:
    generating an objective function from the expression of the failure occurrence probability model and a modification cost function representing a modification cost of at least one of the extracted features; and
    calculating a feature value of the at least one of the extracted features, which makes a value of the generated objective function equal to or less than a target value.

10. The method as set forth in claim 8, wherein the calculating comprises:
    calculating, for each of the extracted features, a product of a coefficient in the expression of the failure occurrence probability model and a unit variation.

11. The method as set forth in claim 8, wherein the calculating comprises:
    calculating a product of a target variation inputted for a designated feature among the extracted features and a coefficient for the designated feature in the expression of the failure occurrence probability model.

12. An information processing apparatus comprising:
    a data storage unit storing, for each group of circuits implemented on a semiconductor device, the number of actual failures occurred in the group and a feature value of each feature that is a failure factor; and
    a processor programmed to execute a procedure comprising:
        extracting features, which are mutually independent, by using data stored in the data storage unit;
        generating an expression of a failure occurrence probability model, which represents a failure occurrence probability, which is obtained by dividing a total sum of the numbers of actual failures by the number of semiconductor devices, as a relation including a sum of products of the feature value of each of the extracted features and a corresponding coefficient, by carrying out a regression calculation using data stored in the data storage unit; and
        calculating an indicator value for design change of the semiconductor device from the generated expression of the failure occurrence probability model.

13. The information processing apparatus as set forth in claim 12, wherein the calculating comprises:
    generating an objective function from the expression of the failure occurrence probability model and a modification cost function representing a modification cost of at least one of the extracted features; and
    calculating a feature value of the at least one of the extracted features, which makes a value of the generated objective function equal to or less than a target value.

14. The information processing apparatus as set forth in claim 12, wherein the calculating comprises calculating, for each of the extracted features, a product of a coefficient in the expression of the failure occurrence probability model and a unit variation.

15. The information processing apparatus as set forth in claim 12, wherein the calculating comprises calculating a product of a target variation inputted for a designated feature among the extracted features and a coefficient for the designated feature in the expression of the failure occurrence probability model.

* * * * *